(12) United States Patent
Forsslund

(10) Patent No.: US 12,103,017 B2
(45) Date of Patent: Oct. 1, 2024

(54) MECHANICAL SEAL DEVICE

(71) Applicant: Alfa Laval Corporate AB, Lund (SE)

(72) Inventor: Johan Forsslund, Stockholm (SE)

(73) Assignee: ALFA LAVAL CORPORATE AB, Lund (SE)

( * ) Notice: Subject to any disclaimer, the term of this patent is extended or adjusted under 35 U.S.C. 154(b) by 78 days.

(21) Appl. No.: 17/918,615

(22) PCT Filed: Mar. 25, 2021

(86) PCT No.: PCT/EP2021/057735
§ 371 (c)(1),
(2) Date: Oct. 13, 2022

(87) PCT Pub. No.: WO2021/213776
PCT Pub. Date: Oct. 28, 2021

(65) Prior Publication Data
US 2023/0142185 A1 May 11, 2023

(30) Foreign Application Priority Data

Apr. 24, 2020 (EP) ..................... 20171270

(51) Int. Cl.
*F16J 15/32* (2016.01)
*B04B 7/00* (2006.01)
*F16J 15/324* (2016.01)
*F16J 15/34* (2006.01)

(52) U.S. Cl.
CPC ............... *B04B 7/00* (2013.01); *F16J 15/324* (2013.01); *F16J 15/342* (2013.01)

(58) Field of Classification Search
CPC ...................................... F16J 15/324
See application file for complete search history.

(56) References Cited

U.S. PATENT DOCUMENTS

| | | | |
|---|---|---|---|
| 3,486,760 A * | 12/1969 | Tracy | F16J 15/342 277/401 |
| 4,654,023 A | 3/1987 | Földhazy | |
| 4,810,240 A | 3/1989 | Zuccato | |
| 5,658,127 A * | 8/1997 | Bond | F01D 25/183 415/230 |
| 6,135,458 A * | 10/2000 | Fuse | F16J 15/342 277/400 |

(Continued)

FOREIGN PATENT DOCUMENTS

| | | |
|---|---|---|
| EP | 2 184 109 B1 | 8/2017 |
| JP | 55-33923 A | 3/1980 |

(Continued)

*Primary Examiner* — Vishal A Patel
(74) *Attorney, Agent, or Firm* — Birch, Stewart, Kolasch & Birch, LLP

(57) ABSTRACT

A mechanical seal device for a centrifugal separator includes a first seal ring including a first seal surface and a second seal ring including a second seal surface. The first and second seal surfaces are configured to face each other to form a seal, and at least one channel for a cooling fluid is arranged in the first seal ring. The at least one channel includes an inlet and an outlet. The outlet of the at least one channel is arranged at the first seal surface of the first seal ring. A centrifugal separator includes the mechanical seal device.

16 Claims, 4 Drawing Sheets

(56) References Cited

U.S. PATENT DOCUMENTS

| | | | |
|---|---|---|---|
| 6,505,836 B1 * | 1/2003 | Toshihiko | F16J 15/342 |
| | | | 277/411 |
| 8,800,995 B2 | 8/2014 | Suefuji | |
| 2012/0274029 A1 | 11/2012 | Khonsari et al. | |
| 2018/0003069 A1 * | 1/2018 | Bidkar | F16J 15/342 |
| 2018/0023559 A1 | 1/2018 | Sato et al. | |
| 2018/0030986 A1 * | 2/2018 | Sen | F04D 29/056 |
| 2018/0353973 A1 | 12/2018 | Hilding | |
| 2019/0381519 A1 | 12/2019 | Aoki et al. | |
| 2020/0016610 A1 | 1/2020 | Hilding et al. | |
| 2020/0308787 A1 | 10/2020 | Morita | |

FOREIGN PATENT DOCUMENTS

| | | |
|---|---|---|
| JP | 55-126161 A | 9/1980 |
| JP | S59-137460 U | 9/1984 |
| JP | 7-42659 A | 2/1995 |
| JP | 2009-156294 A | 7/2009 |
| JP | 2012-167696 A | 9/2012 |
| JP | 2016-166624 A | 9/2016 |
| JP | 2019-148300 A | 9/2019 |
| JP | 2019-158025 A | 9/2019 |
| WO | WO 2009/008393 A1 | 1/2009 |
| WO | WO 2019/124041 A1 | 6/2019 |

* cited by examiner

MECHANICAL SEAL DEVICE

TECHNICAL FIELD

The invention relates to a mechanical seal device for a centrifugal separator according to the appended claims. The invention also relates to a centrifugal separator comprising a mechanical seal device according to the appended claims.

BACKGROUND AND PRIOR ART

Centrifugal separators are configured to separate liquids, gases and solid particles from each other. In addition, liquids of different density, which are mixed together, may also be separated from each other in the centrifugal separator. Gases of different density, which are mixed together, may also be separated from each other in the centrifugal separator. The centrifugal separator should be sealed on order to prevent the liquids, gases or solid particles to leak out from the centrifugal separator. Since some parts of the centrifugal separator rotate, leakage may occur between the rotational parts and stationary parts. Therefore, mechanical seals may be arranged between the rotational and stationary parts in the separator. Due to the relative rotational movement between the rotational and stationary parts, heat may be generated between the sealing surfaces of the mechanical seals, which are arranged between these rotational and stationary parts. In some centrifugal separator applications, the mechanical seal may provide a hermetic seal.

Document US 2020/016610 A1 discloses a seal assembly for a centrifugal separator. The seal assembly comprises two sealing rings, which are arranged so that a double contact seal is formed upon engagement of the two sealing rings. A chamber in one or both sealing rings may be supplied with a cooling fluid. The chamber may be used for detecting leaks in the seal assembly. Further, a fluid under pressure may be supplied to the chamber in order to prevent leakage in the seal assembly.

Document U.S. Pat. No. 4,654,023 A, discloses a mechanical seal for a casing of centrifugal separators. Two sealing rings are abutting axially against each other, one is rotatable and one is non-rotatable, in order to seal the interior of the casing from connection with the space surrounding a radial bearing via the opening in the bottom of the casing.

SUMMARY OF THE INVENTION

The generated heat in the mechanical seal due to the relative movement between the seal surfaces may reduce the life span of the mechanical seal. In addition, the generated heat in the mechanical seal may result in seal failure and leakage. Further, large temperature differences in different areas of the mechanical seal may result in seal failure and leakage, and a reduced life span. Therefore, there is a need to develop a mechanical seal device for a centrifugal separator having a longer life span and which provides a tight seal without seal failure and leakage. Further, there is a need to develop a mechanical seal device for a centrifugal separator in which the temperature differences in the seal are low. In addition, there is a need to develop a centrifugal separator provided with a mechanical seal device having a long life span and which provides a tight seal without seal failure and leakage.

Thus, an object of the present invention is to develop a mechanical seal device for a centrifugal separator having a long life span and which provides a tight seal without seal failure and leakage. Further, there is an object to develop a mechanical seal device for a centrifugal separator, which provides a hermetic seal. Further, there is an object to develop a mechanical seal device for a centrifugal separator in which the temperature differences in the seal is low. In addition, there is an object to develop a centrifugal separator provided with a mechanical seal device having a long life span and which provides a tight seal without seal failure and leakage.

This is achieved by a mechanical seal device for a centrifugal separator according to the appended claims. This is also achieved by a centrifugal separator comprising a mechanical seal device according to the appended claims.

According to an aspect of the invention, a mechanical seal device for a centrifugal separator is provided. The mechanical seal device comprises: a first seal ring comprising a first seal surface; a second seal ring comprising a second seal surface, wherein the first and second seal surfaces are configured to face each other to form a seal of the sealing ring; the first seal ring has a first central axis and the second seal ring has a second central axis, wherein the first central axis of the first seal ring is configured to coincide with the second central axis of the second seal ring; at least one channel for a cooling fluid is arranged in the first seal ring, wherein the at least one channel comprises an inlet and an outlet; the outlet of the at least one channel is arranged at the first seal surface of the first seal ring, wherein the outlet of the at least one channel is arranged at a larger radial distance from the first central axis than an outer radius of the formed seal.

The seal assembly is thus a mechanical seal that may form a hermetic seal. The seal assembly is for forming a seal between a stationary part and a rotatable part. Such mechanical seal device has a long life span and will provide a tight seal with reduced risk for seal failure and leakage. Further, the temperature differences in the mechanical seal device will also be low.

According to the disclosure, the outlet of the at least one channel is arranged at a larger radial distance from the first central axis than the outer radius of the formed seal, Therefore, the outlet of the at least one channel will be arranged radially outwards of the formed seal of the sealing device. No further seals are formed in the same axial plane between two opposing sealing surfaces radially outwards of the outlet of the channel in the mechanical sealing device.

The cooling fluid absorbs heat in the mechanical seal device and thus reduces the temperature in the mechanical seal device. Further, since the outlet of the at least one channel is arranged at, i.e. next to or beside, the first seal surface of the first seal ring, the cooling fluid will pass adjacent to the first seal surface and thus the formed seal. Heat generated by the relative movement of the first and second seal surfaces may be absorbed by the cooling fluid, when the cooling fluid flows in the at least one channel. The at least one channel is configured to equalize the temperature in the seal rings. An equalized temperature in the seal rings may prevent cracks and deformations of the seal rings and of the first and second seal surfaces. When the cooling fluid flows out of the at least one channel, the cooling fluid flows to the area of the first and second seal surfaces, since the outlet of the at least one channel is arranged at, i.e. next to or beside, the formed seal of the sealing device between the first and second seal surfaces. Heat generated by the relative movement of the first and second seal surfaces may be absorbed by the cooling fluid, when the cooling fluid has a fluid connection with the first and second seal surfaces. This will reduce the temperature in the first and second seal surfaces.

According to an aspect of the invention, a centrifugal separator is provided. The centrifugal separator comprises the mechanical seal device disclosed herein.

Such centrifugal separator provided with the mechanical seal device disclosed herein will have a long life span and will also provide a tight seal with reduced risk for seal failure and leakage.

Additional objectives, advantages and novel features of the invention will be apparent to one skilled in the art from the following details, and through exercising the invention. While the invention is described below, it should be apparent that the invention may be not limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which.

DETAILED DESCRIPTION OF THE DRAWINGS

Figure 1:
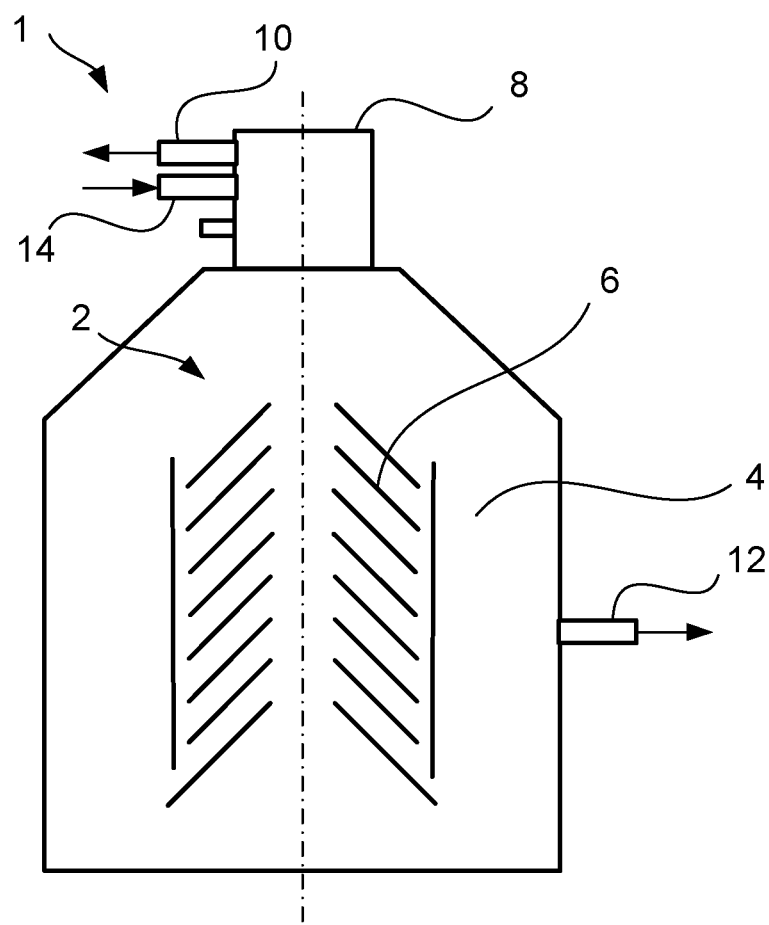
FIG. 1 schematically illustrates a centrifugal separator according to an example, FIG. 2 schematically illustrates a sectional view of an in- and outlet device of a centrifugal separator according to an example, FIG. 3 schematically illustrates a sectional view along line I-I in FIG. 2, and FIG. 4 schematically illustrates a detail view of FIG. 2.

According to the present disclosure, a mechanical seal device for a centrifugal separator is provided. The mechanical seal device comprises: a first seal ring comprising a first seal surface and a second seal ring comprising a second seal surface, wherein the first and second seal surfaces are configured to face each other to form a seal of the mechanical seal device. The first seal ring has a first central axis and the second seal ring has a second central axis, wherein the first central axis of the first seal ring is configured to coincide with the second central axis of the second seal ring. This means that the first and second seal rings may have a common central axis. At least one channel for a cooling fluid is arranged in the first seal ring, wherein the at least one channel comprises an inlet and an outlet. The outlet of the at least one channel is arranged at, i.e. next to or beside, the first seal surface of the first seal ring. The outlet of the at least one channel is arranged at a larger radial distance from the first central axis than an outer radius of the formed seal.

The formed seal of the mechanical seal device is thus located radially inwards of the outlet of the channel. The mechanical seal device does not form further seals or sealing interfaces between opposing surfaces of the first and second sealings rings, which extend radially an in the same axial plane as the first and second surfaces, i.e. radially outwards of the channel for the cooling fluid. Thus, the formed seal is a type of a single contact seal.

The mechanical seal device may be arranged between a rotational part and stationary part in the centrifugal separator. The mechanical seal device may alternatively be arranged between two rotational parts, which have different rotational speeds. The mechanical seal device may be configured to prevent fluids or gases to pass the seal. The fluid or gas may however form a very thin film between the seal surfaces of the seal. This thin film has a lubricating effect on the seal surfaces.

The mechanical seal device may provide a hermetic seal, which prevents any fluid or gas to pass the seal.

The centrifugal separator may be configured for separating fluids and gases with different densities. The separator may comprise a rotor that forms within itself a separation chamber in which centrifugal separation of the fluids or gases takes place during operation. The separation chamber is provided with a stack of frusto-conical separation discs to facilitate effective separation of the fluids or gases. The stack of truncated conical separation discs are examples of surface-enlarging inserts and are fitted centrally and coaxially with the rotor. During operation of the separator, fluids or gases to be separated are brought into the separation space. Depending on the density, different phases in the fluids or gases are separated between the separation discs. A heavier component of the fluids or gases moves radially outwards between the separation discs, whereas the phase of lowest density, moves radially inwards between the separation discs and is forced through an outlet arranged at the radial innermost level in the separator. The component of higher density is instead forced out through an outlet that is at a larger radial distance. Any possible solids, or sludge, in the fluid will accumulate at the periphery of the separation chamber and is emptied intermittently from the separation space by a set of radially sludge outlets being opened, whereupon the sludge is discharged.

The first seal ring may have a diameter and axial extension, which are adapted for the type and size of the centrifugal separator. The first seal surface of the first seal ring has a circular configuration. The first seal surface has a smoothness that provides for an effective seal of fluids and gases.

The second seal ring may have a diameter and axial extension, which are adapted for the type and size of the centrifugal separator. The second seal surface of the second seal ring has a circular configuration. The second seal surface has a smoothness that provides for an effective seal of fluids and gases.

The first and second seal surfaces are configured to face each other. The contact area between the first and second seal surfaces constitutes the seal of the mechanical seal device. Alternatively, an interface provided by a thin film of fluid or gas between the first and second seal surfaces constitutes the seal of the mechanical seal device.

The first and second seal surfaces may have same or different areas. The first and second seal surfaces may have same or different smoothness.

An actuator may be arranged for urging the first and second seal surfaces together. Such actuator may be a spring, such as a coil spring.

Due to the relative rotational movement between the first and second seal surfaces, heat may be generated in the sealing surfaces and in the first and second seal rings. In addition, the fluids and gases to be separated in the centrifugal separator may have a high temperature, which may increase the temperature in the first and second seal rings. The at least one channel, which is arranged in the first seal ring is configured to reduce the temperature in the mechanical seal device. In addition, the at least one channel is configured to equalize the temperature in the first seal ring. An equalized temperature in the first seal ring may prevent cracks and deformations in the first seal ring and the first seal surface. In addition, the at least one channel is configured to equalize the temperature in the second seal ring. An equalized temperature in the second seal ring may prevent cracks and deformations in the second seal ring and the second seal surface.

The cooling fluid may be provided from a cooling fluid source, which is connected to the centrifugal separator and the at least one cooling channel of the mechanical seal device. The cooling fluid may be cooled in the cooling fluid source. The cooling fluid may have a certain initial temperature when it enters the centrifugal separator, which is adapted to the specific separation process in the centrifugal separator. The cooling fluid may be a liquid, a gas or a powder. The cooling fluid may have lubricating properties. The cooling fluid absorbs heat in the mechanical seal device and thus reduces the temperature in the mechanical seal device. A pump may be arranged for generating a flow of the cooling fluid in the at least one channel. The gravity may generate a flow of the cooling fluid in the at least one channel.

The at least one channel comprises an inlet and an outlet arranged in the first seal ring. The cooling fluid is configured to enter the at least one channel through the inlet, and to leave the at least one channel through the outlet. Thus, the at least one channel may form a cooling channel.

Since the outlet of the at least one channel is arranged at, i.e. beside the first seal surface of the first seal ring, the cooling fluid will pass adjacent to the first seal surface. Heat generated by the relative movement of the first and second seal surfaces may be absorbed by the cooling fluid, when the cooling fluid flows in the at least one channel. When the cooling fluid flows out of the at least one channel, the cooling fluid flows to the area of the first and second seal surfaces. Heat generated by the relative movement of the first and second seal surfaces may be absorbed by the cooling fluid, when the cooling fluid has a fluid connection with the first and second seal surfaces. This will reduce the temperature in the first and second seal surfaces.

Further, since the outlet of the at least one channel is arranged at a larger radial distance from the first central axis than an outer radius of the formed seal, the outlet of the at least one channel will be arranged radially outwards of the outer radius of the first seal surface of the first seal ring. This configuration will reduce the temperature in the seal rings and also in the first and second seal surfaces.

According to an aspect, the outlet of the at least one channel is arranged in fluid connection with the first seal surface of the first seal ring and the second seal surface of the second seal ring.

According to an aspect, an outer radius of the second seal surface of the second seal ring is larger than the outer radius of the first seal surface of the first seal ring, and wherein the outlet of the at least one channel is directed towards the second seal surface of the second seal ring. Thus, the outlet of the at least one channel is arranged and positioned at least partly radially inside the outer radius of the second seal surface of the second seal ring. This will result in the cooling fluid flowing on that part of the second seal surface which is positioned radially outside the outer radius of the first seal surface of the first seal ring. Heat generated in the second seal ring may then be effectively absorbed by the cooling fluid, when the cooling fluid has a fluid connection directly with the second seal surface. This will reduce the temperature in the second seal surface. Further, when the cooling fluid flows on that part of the second seal surface which is positioned radially outside the outer radius of the first seal surface of the first seal ring, the cooling fluid may easily enter between the seal surfaces and form a very thin film between the seal surfaces. This thin film has a lubricating effect on the seal surfaces.

According to an aspect, a restriction portion is arranged in or at the at least one channel for restricting the flow of the cooling fluid.

The restriction portion will reduce the flow rate of the cooling fluid in the at least one channel. In addition, the volume flow of the cooling fluid in the at least one channel will be reduced by the restriction portion. The restriction portion may be a portion of the at least one channel having a reduced diameter. The entire length of the at least one channel may be provided with a reduced diameter in order to achieve a reduced flow rate and volume flow.

According to an aspect, the restriction portion is configured to at least partly cover the inlet opening of the at least one channel.

The restriction portion may be a member arranged to partly cover the inlet opening and thus restrict the cooling fluid to enter the inlet opening. The restriction portion may be a member arranged in the inlet opening and in the at least one channel for partly cover the inlet opening. The restriction portion may be a member arranged on the outside of the inlet opening and thus on the outside of the at least one channel for partly cover the inlet opening. The restriction portion will reduce the flow rate and the volume flow of the cooling fluid in the at least one channel.

According to an aspect, the restriction portion is a washer element configured to rest on the first seal ring and configured to at least partly cover the inlet of the at least one channel.

The inner diameter of the washer element may be larger than the inner diameter of the first seal ring. The inlet of the at least one channel in the first seal ring may be partly covered by the inner periphery of the washer element. The outer diameter of the washer element may be smaller than the outer diameter of the first seal ring. The inlet of the at least one channel in the first seal ring may be partly covered by the outer periphery of the washer element. The inner or outer periphery of the washer element may be provided with a bevel, which is adapted so the washer element partly covers the inlet of the at least one channel. Alternatively, the washer element may comprise a through hole having a smaller diameter than the inlet of the at least one channel.

According to an aspect, at least two channels are evenly distributed around the first seal ring.

Distributing the at least two channels evenly around the first seal ring may evenly distribute the flow of the cooling fluid through the channels. This will equalize the temperature in the first seal ring and the thus avoid any temperature gradients in the first seal ring.

According to an aspect, the number of channels may be in the interval 2-10, such as 4-8, for example 6, which channels are evenly distributed around the first seal ring. Thereby, sufficient cooling around the periphery of the sealing ring can be provided, while the mechanical properties are not negatively affected. However, a large centrifugal separator provided with a mechanical seal device with a large diameter may comprise a larger number of channels, which are evenly distributed around the first seal ring.

By evenly distributing the channels around the first seal ring may evenly distribute the flow of the cooling fluid through the channels. This will equalize the temperature in the first seal ring and thus avoid any temperature gradients in the first seal ring.

According to an aspect, the material in the second seal ring is harder than the material in the first seal ring.

Since the first seal surface of the first seal ring may slide on the second seal surface of the second seal ring during the relative movement between the first and second seal rings, wear of the surfaces may occur. Since the material in the second seal ring is harder than the material in the first seal ring, the wear will substantially occur in the first sealing ring. Therefore, only the first seal ring may be replaced during maintenances of the mechanical seal device.

According to an aspect, the material in the second seal ring comprises silicon carbide and the material in the first seal ring is graphite.

The silicon carbide in the second seal ring is harder than the graphite in the first seal ring. Therefore, wear will substantially occur in the first sealing ring. Thus, only the first seal ring may be replaced during maintenances of the mechanical seal device. The first seal ring made of graphite may be manufactured at low cost. Thus, the replacement of the first seal ring can be done to low cost.

According to an aspect, the material in the second seal ring has a larger thermal conductivity than the thermal conductivity of the material in the first seal ring.

The larger thermal conductivity in the second seal ring may absorb heat from the heat generation in the relative movement of the seal surfaces and transfer the heat away from the second seal surface. Since the at least one channel is arranged in the first seal ring, generated heat will be transferred away from the first seal ring by means of the cooling fluid.

According to an aspect, the at least one channel in the first seal ring has an extension parallel with the first central axis.

By arranging the first seal ring in a position so that the first central axis has a vertical extension in the centrifugal separator, the at least one channel in the first seal ring will also have a vertical extension. The cooling fluid may flow by gravity in the at least one channel if the channel has a vertical extension.

According to an aspect, the first seal surface of the first seal ring has first normal and the second seal surface of the second seal ring has a second normal, and wherein the direction of the first and second normal are in parallel with the direction of the first central axis of the first seal ring and with the second central axis of the second seal ring.

The first and second seal surfaces are configured to face each other to form the seal. The first and second normals of the seal surfaces are thus directed towards each other. This arrangement will result in a tight seal without seal failure and leakage. The contact area of the first and second seal surface will be defined by the inner and outer diameter of the first and second seal rings.

According to an aspect, the first seal ring is configured to be stationary arranged and the second seal ring is configured to be rotatably arranged.

A stationary first seal ring may simplify the arrangement of guiding the cooling fluid through the at least one channel.

According to the present disclosure, a centrifugal separator is provided. The centrifugal separator comprises the mechanical seal device disclosed herein.

Such centrifugal separator provided with the mechanical seal device disclosed herein will have a prolonged life span and will also provide a tight seal with reduced risk for seal failure and leakage. In addition, the maintenance of the mechanical seal device in the centrifugal separator will be simplified and done to a low cost.

The mechanical seal device for a centrifugal separator and the centrifugal separator comprising the mechanical seal device will now be described together with the appended drawings.

Figure 2:
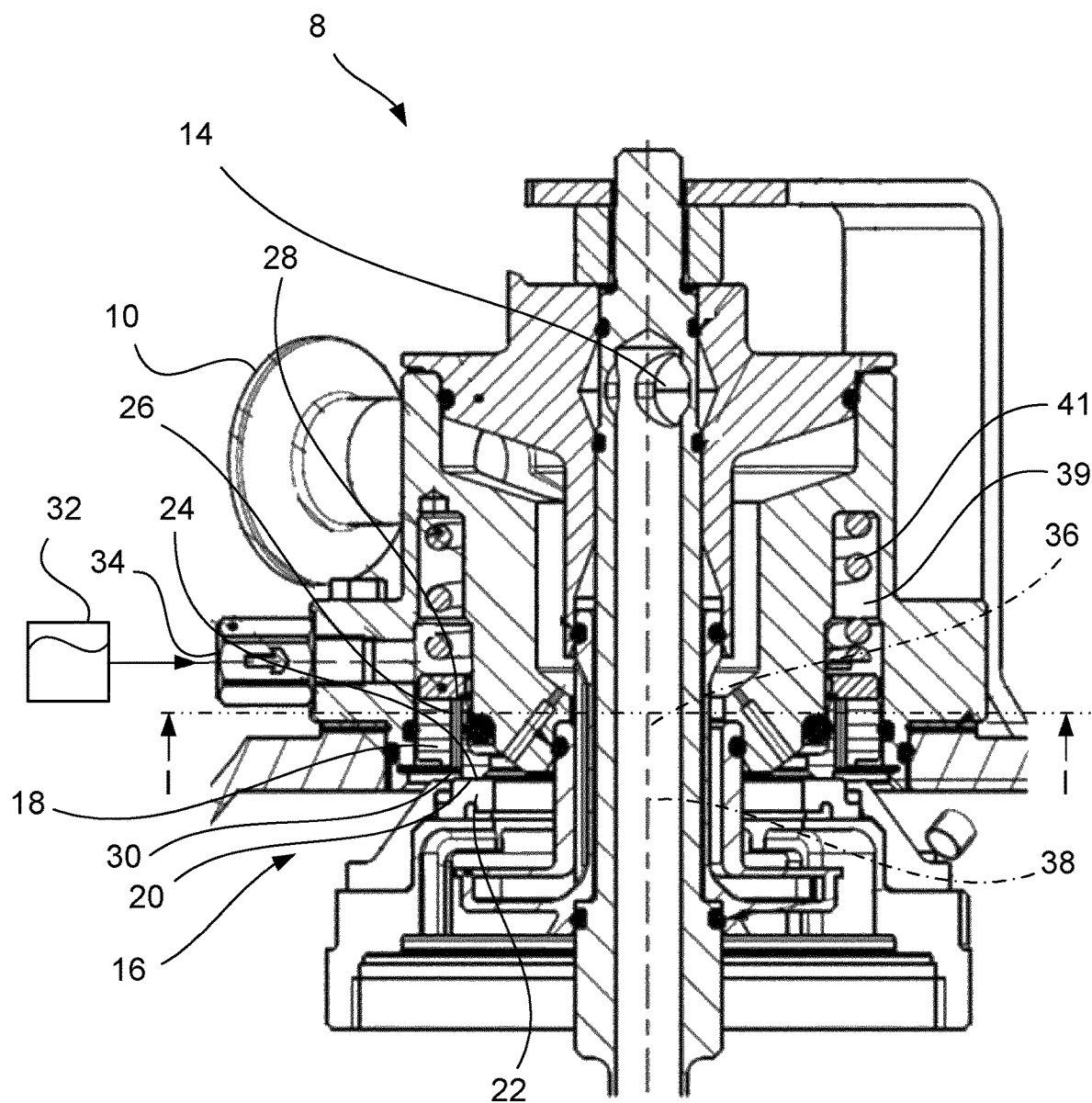

FIG. 1 schematically illustrates a centrifugal separator 1 according to an example. The separator 1 comprises a rotor 2 that forms within itself a separation chamber 4 in which centrifugal separation of the fluids or gases takes place during operation. The separation chamber 4 is provided with a stack of frusto-conical separation discs 6 to facilitate effective separation of the fluids or gases. During operation of the separator, fluids or gases to be separated are brought into the separation chamber 4 through an in- and outlet device 8 of the centrifugal separator 1. Depending on the density, different phases in the fluids or gases are separated between the separation discs. A heavier component of the fluids or gases will move radially outwards between the separation discs 6, whereas the phase of lowest density, will move radially inwards between the separation discs 6 and is forced through a first outlet 10 arranged at the radial innermost level in the separator 1 and further to the in- and outlet device 8. The component of higher density is forced out through a second outlet 12 that is at a larger radial distance, which component will be emptied intermittently from the separation chamber 4. The in- and outlet device 8 comprises a first inlet 14 for fluids or gases to be separated FIG. 2 schematically illustrates a sectional view of an in- and outlet device 8 of a centrifugal separator 1 according to an example. The in- and outlet device 8 comprises the first inlet 14 and the first outlet 10. A mechanical seal device 16 is arranged in the in- and outlet device 8. The mechanical seal device 16 comprising a first seal ring 18, which has a first seal surface 20 and a second seal ring 22, which has a second seal surface 24. The first and second seal surfaces 20, 24 are configured to face each other to form a seal. Channels 26 for a cooling fluid is arranged in the first seal ring 18. Each channel 26 comprises an inlet 28 and an outlet 30. The outlet 30 of each channel 26 is arranged at, i.e. beside, the first seal surface 20 of the first seal ring 18. Each channel 26 is arranged in fluid connection with the first seal surface 20 of the first seal ring 18 and the second seal surface 24 of the second seal ring 22. The cooling fluid is provided from a cooling fluid source 32, which is connected to a second inlet 34 of the centrifugal separator 1. The first seal ring 18 is configured to be stationary arranged in the in- and outlet device 8. The second seal ring 22 is connected to a rotatable component of the centrifugal separator 1 and therefore the second seal ring 22 is configured to be rotatably arranged.

The first seal ring 18 has a first central axis 36 and the second seal ring 22 has a second central axis 38. The channels 26 in the first seal ring 18 extend in parallel with the first central axis 36. The first central axis 36 of the first seal ring 18 coincides with the second central axis 38 of the second seal ring 22.

The cooling fluid enters the centrifugal separator 1 through the second inlet 34. From the second inlet 34 the cooling fluid flows into a cavity 39 in which an actuator 41 is arranged for urging the first and second seal surfaces 20, 24 together. In FIG. 2 the actuator 41 is a spring.

Figure 3:
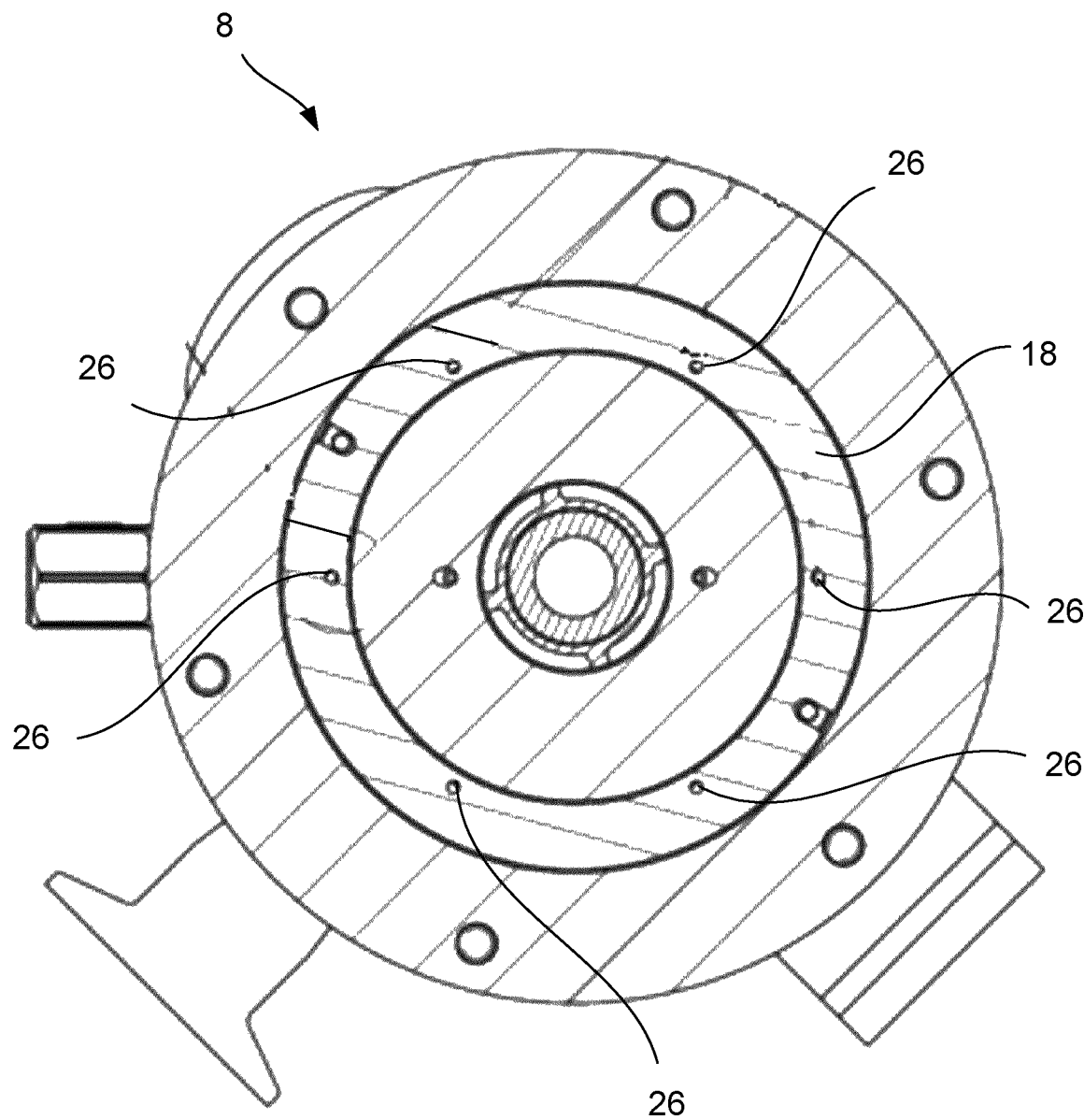

FIG. 3 schematically illustrates a sectional view along line I-I in FIG. 2. Six channels 26 are arranged in the first seal ring 18. The channels 26 are evenly distributed around the first seal ring 18, so that flow of cooling fluid through the channels 26 is evenly distributed. The evenly distributed channels 26 in the first seal ring 18 will equalize the temperature in the first seal ring 18 and thus avoid any temperature gradients in the first seal ring 18.

Figure 4:
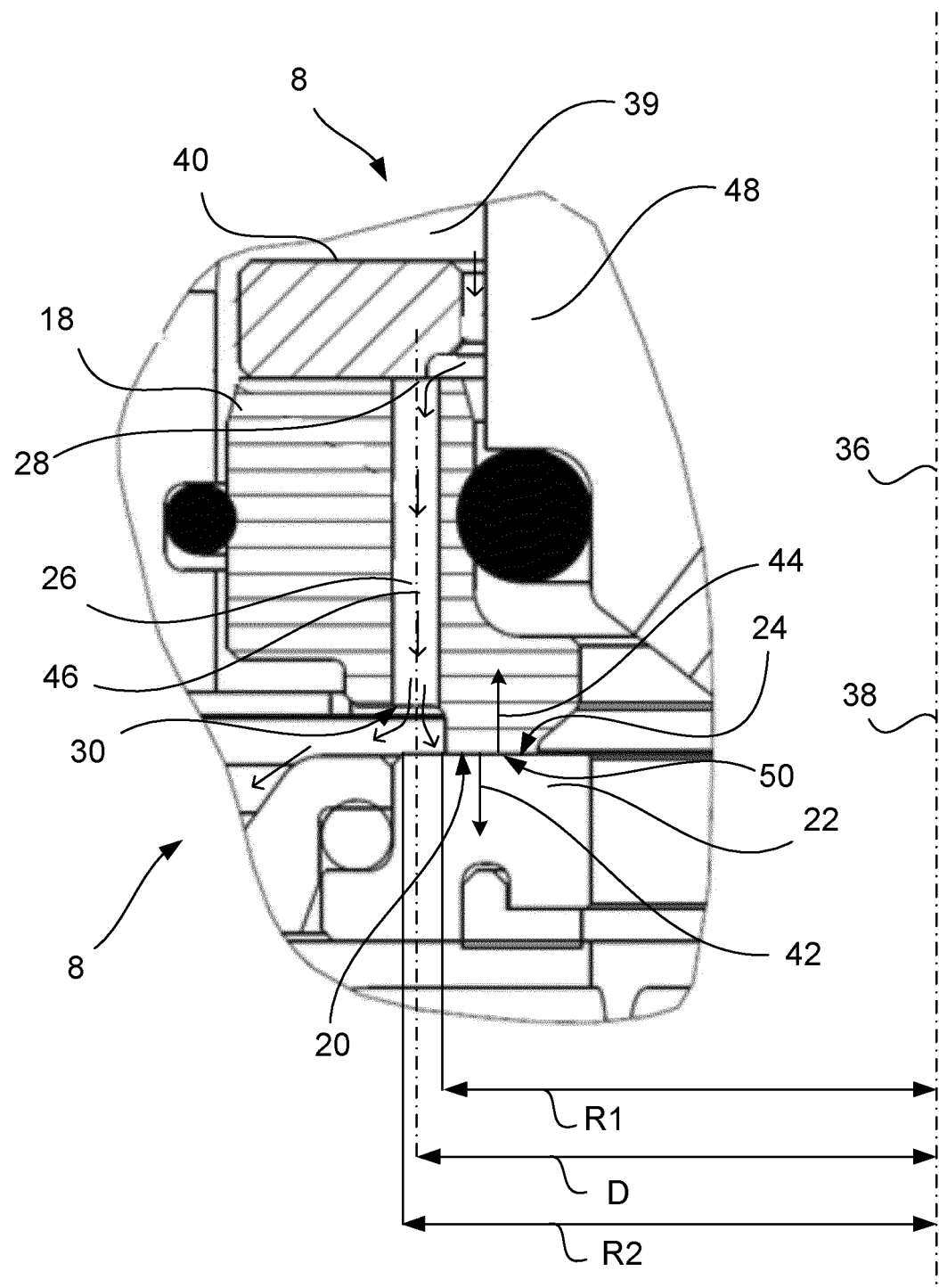

FIG. 4 schematically illustrates a detailed view of FIG. 2. The detailed view shows the mechanical seal device 16 in more detail. A washer element 40 is configured to rest on the first seal ring 18 and configured to at least partly cover the inlet 28 of the channel 26. The washer element 40 will restrict the flow of the cooling fluid in the channel 26. By associating washer elements or other restrictions of this type in connection with each channel, the flow of the cooling fluid through the channels 26 can be evenly distributed.

The first seal surface 20 of the first seal ring 18 has first normal 42 and the second seal surface 24 of the second seal ring 22 has a second normal 44. The direction of the first and second normals 42, 44 is parallel with the direction of the first central axis 36 of the first seal ring 18 and with the second central axis 38 of the second seal ring 22. A seal and/or sealing interface 50 of the mechanical seal device 16 is formed between the first and second seal surfaces 20, 24.

Arrows 46 in FIG. 4 represent the flow direction and the flow path of the cooling fluid. The cooling fluid enters the centrifugal separator 1 through the second inlet 34 (see FIG. 2) and further into the cavity 39. From the cavity 39 the cooling fluid flows through a circular passage formed between the washer element 40 and a static element 48 of the in- and outlet device 8 of the centrifugal separator 1. Thereafter, the cooling fluid flows into the inlet 28 of the channels 26 and towards the outlet 30.

The outlet 30 of the channel 26 is arranged at a larger radial distance D from the first central axis 36 than an outer radius R1 of the first seal surface 20 of the first seal ring 18. The outer radius R1 also forms an outer radius R1 for the formed seal 50, since the seal is formed between the first and second seal surfaces 20, 24. Thus, the outlet 30 of the channel 26 will be arranged radially outside the outer radius R1 of the first seal surface 20 of the first seal ring 18. The outlet 30 of the channel 26 is arranged at, i.e. beside the first seal surface 20 of the first seal ring 18. The cooling fluid will therefore pass adjacent to the first seal surface 20 and thus the seal 50 of the mechanical seal device. No further seals between the first and second seal surfaces of the first and second seal rings are comprised radially outwards of the seal 50, as can be seen from the drawing.

An outer radius R2 of the second seal surface 24 of the second seal ring 22 is larger than the outer radius R1 of the first seal surface 20 of the first seal ring 18, and in this way the outlet 30 of the at least one channel 26 can be directed towards the second seal surface 24 of the second seal ring 22. In this way the cooling fluid will therefore flow on the part of the second seal surface 24, which is positioned radially outside of the first seal surface 20 of the first seal ring 18 having the outer radius R1. A small part of the flow of the cooling fluid may thus enter between the seal surfaces 20, 24 and form a very thin fluid film between the seal surfaces 20, 24. However, the majority of the cooling fluid after passing the first and second seal rings 18, 22 will drain though an outlet port (not shown) of the centrifugal separator 1.

The foregoing description of the examples of the present disclosure is provided for illustrative and descriptive purposes. It is not intended to be exhaustive or to restrict the disclosure to the examples and variants described. Many modifications and variations will obviously be apparent to one skilled in the art. The examples have been chosen and described in order best to explain the principles of the disclosure and its practical applications and hence make it possible for specialists to understand the disclosure for various examples and with the various modifications appropriate to the intended use.

The invention claimed is:

1. A mechanical seal device for a centrifugal separator, the mechanical seal device comprising:
   a first seal ring comprising a first seal surface; and
   a second seal ring comprising a second seal surface,
   wherein the first and second seal surfaces are configured to face each other to form a seal of the mechanical seal device,
   wherein the first seal ring has a first central axis and the second seal ring has a second central axis, and wherein the first central axis of the first seal ring is configured to coincide with the second central axis of the second seal ring,
   wherein at least one channel for a cooling fluid is arranged in the first seal ring, and wherein the at least one channel comprises an inlet and an outlet, and
   wherein the outlet of the at least one channel is arranged at the first seal surface of the first seal ring,
   wherein the outlet of the at least one channel is arranged at a larger radial distance from the first central axis than an outer radius of the first seal surface,
   wherein a restriction portion is arranged in connection with the at least one channel for restricting the flow of the cooling fluid,
   wherein the restriction portion is configured to at least partly cover the inlet of the at least one channel, and
   wherein the restriction portion is a washer element configured to rest on the first seal ring.

2. The device according to claim 1, wherein the outlet of the at least one channel is arranged in fluid connection with the first seal surface of the first seal ring and the second seal surface of the second seal ring.

3. The device according to claim 1, wherein an outer radius of the second seal surface of the second seal ring is larger than the outer radius of the first seal surface of the first seal ring, and
   wherein the outlet of the at least one channel is directed towards the second seal surface of the second seal ring.

4. The device according to claim 1, wherein at least two channels are evenly distributed around the first seal ring.

5. The device according to claim 1, wherein the number of channels is in the interval 4-8, the channels being evenly distributed around the first seal ring.

6. The device according to claim 1, wherein a material in the second seal ring is harder than a material in the first seal ring.

7. The device according to claim 1, wherein a material in the second seal ring comprises silicone carbide and a material in the first seal ring is graphite.

8. The device according to claim 1, wherein a material in the second seal ring has a larger thermal conductivity than a thermal conductivity of a material in the first seal ring.

9. The device according to claim 1, wherein the at least one channel in the first seal ring has an extension parallel with the first central axis.

10. The device according to claim 1, wherein the first seal surface of the first seal ring has a first normal and the second seal surface of the second seal ring has a second normal, and wherein directions of the first and second normals are parallel with a direction of the first central axis of the first seal ring and with a direction of the second central axis of the second seal ring.

11. The device according to claim 1, wherein the first seal ring is configured to be stationary and the second seal ring is configured to be rotatable.

12. A centrifugal separator comprising the mechanical seal device according to claim 1.

13. The device according to claim 2, wherein an outer radius of the second seal surface of the second seal ring is larger than the outer radius of the first seal surface of the first seal ring, and wherein the outlet of the at least one channel is directed towards the second seal surface of the second seal ring.

14. The device according to claim 1, wherein the first seal ring comprising an inner circumferential surface, an outer circumferential surface, a first end surface and a second end surface, the first end surface having a stepped surface and the first seal surface, the stepped surface being spaced from the first seal surface in an axial direction, and wherein the outlet of the at least one channel is in the stepped surface.

15. The device according to claim 1, wherein the inlet of the at least one channel is in the second end surface.

16. The device according to claim 15, further comprising a restriction portion partially covering the inlet of the at least one channel.

\* \* \* \* \*